May 31, 1955                C. A. MENDENHALL                2,709,369
                         ENGINE STARTING GEARING
                           Filed Aug. 24, 1953
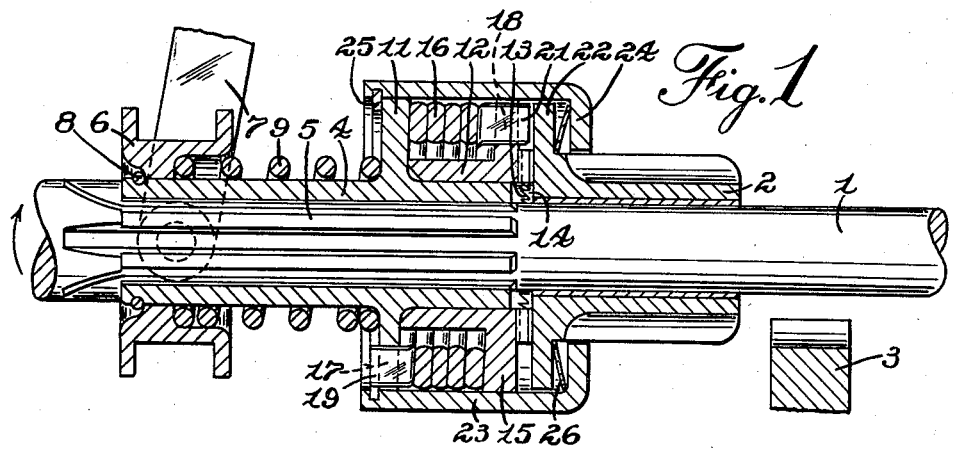
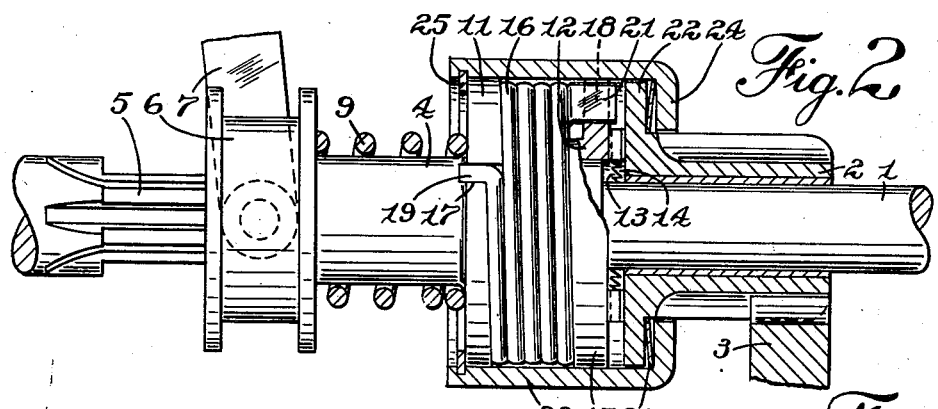
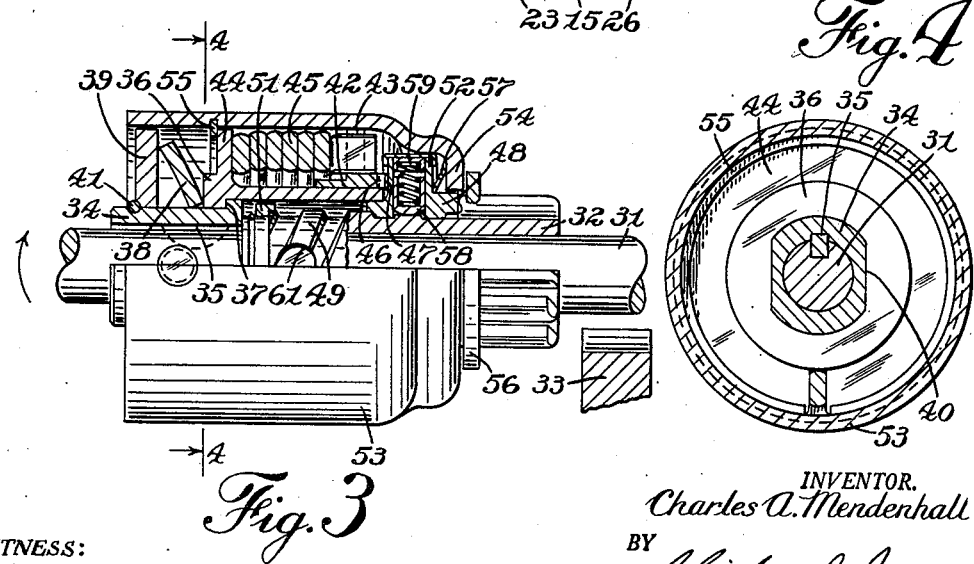
WITNESS:
Esther M. Stockton
INVENTOR.
Charles A. Mendenhall
BY
Clinton L. James
ATTORNEY United States Patent Office 2,709,369
Patented May 31, 1955

2,709,369
ENGINE STARTING GEARING

Charles A. Mendenhall, Elmira, N. Y., assignor to Bendix Aviation Corporation, a corporation of Delaware Application August 24, 1953, Serial No. 375,975

2 Claims. (Cl. 74—6)

The present invention relates to engine starting gearing and more particularly to that type in which a pinion having an overrunning clutch connection to the starting motor is moved into mesh with an engine gear and held in mesh until the engine is reliably self-operative.

It is an object of the present invention to provide novel engine starter gearing which is efficient and reliable in operation and simple and economical in construction.

It is another object to provide such a device incorporating a dental type of overrunning clutch with novel means for controlling the overrunning action.

It is another object to provide such a device incorporating a yielding driving connection which also serves to control the overrunning clutch.

Further objects and advantages will be apparent from the following description taken in connection with the accompanying drawing in which:

Fig. 1 is a longitudinal substantially mid-sectional view of a manually operable gear shift constructed in accordance with the present invention, the parts being shown in idle position;

Fig. 2 is a similar view showing the parts in cranking position;

Fig. 3 is a side elevation partly broken away and in section of an automatically shiftable starter drive embodying the invention; and Fig. 4 is a section taken substantially on the line 4—4 of Fig. 3.

In Fig. 1 of the drawing there is illustrated a power shaft 1 on which a drive pinion 2 is slidably journaled for movement into and out of mesh with a gear 3 of an engine to be started. A driving member in the form of a sleeve 4 is splined on the power shaft 1 as indicated at 5, and has slidably mounted thereon a shift collar 6 arranged to be actuated by a shift fork 7 which may be operated manually or by suitable electromagnetic means. The shift collar 6 is yieldably pressed against a stop ring 8 by means of a compression spring 9 bearing on the collar 6 at one end and against a flange 11 on the sleeve 4 at its other end.

A clutch member 12 is journaled on the end of the sleeve 4 and is provided with inclined clutch teeth 13 adapted to engage similar clutch teeth 14 formed on the adjacent end of the pinion 2. Clutch member 12 is formed with a radial flange 15, and a close-wound drive spring 16 having radially flattened convolutions is anchored at its ends to the flange 11 of sleeve 4 and flange 15 of clutch member 12, respectively, to form a yielding driving connection therebetween.

As best shown in Fig. 2, the flanges 11, 15 are provided with notches 17 and 18, respectively, which are adapted to receive the outturned ends 19 and 21 of the spring 16 and thereby provide torque-transmitting anchorages between these elements. The surfaces of the flanges 11 and 15 adjacent the ends of the spring 16 are conformed to the ends of the spring to provide substantially full surface contact between the end convolutions of the spring and said flanges. As above stated, the spring 16 is close-wound, that is the convolutions of the spring are in contact with each other whereby the space between the flanges 11, 15 is determined by the thickness and the number of convolutions of the spring.

The pinion 2 is also provided with a radial flange 22, and a barrel member 23 surrounds and encloses the flanged members and spring, and limits the separation of the flange 11 of the drive member from the flange 22 of the pinion. This is accomplished by means of an inturned flange 24 on one end of the barrel and a lock ring 25 at its other end, bearing against the flange 11 of sleeve 4 and so positioned as to limit the separation of the pinion and drive sleeve to that amount necessary to permit the clutch teeth 13, 14 to disengage and overrun when the drive spring 16 is not under load. A light clutch spring 26 is interposed between the flange 22 of the pinion and the flange 24 of the barrel member in order to normally hold the clutch teeth in engagement.

In operation, the pinion 2 is first shifted into mesh with the engine gear 3 by operation of the shift fork 7, after which the power shaft 1 is rotated by the starting motor, not illustrated, in the usual manner. The cranking load so transmitted causes the drive spring 16 to be wound up for a substantial portion of a convolution as shown in Fig. 2. This winding up of the spring increases its length, thereby causing the clutch sleeve 12 to move toward the pinion 2 and thus prevent disengagement of the clutch teeth during the cranking operation. When the engine starts, the release of the cranking load on the drive spring 16 permits it to unwind and return to its original length, thus permitting the clutch teeth 13, 14 to overrun until the pinion and its associated parts are moved back to idle position by the shift fork 7.

In Fig. 3 of the drawing there is illustrated a starter drive of the automatically engaging and disengaging type embodying the principles of the present invention. As there illustrated, a power shaft 31 has a pinion and screw shaft member 32 slidably journaled thereon for meshing engagement with an engine gear 33. A driving sleeve 34 is keyed on the shaft 31 as indicated at 35 and a flanged driving member 36 is slidably but non-rotatably mounted on said sleeve as by means of a "double D" section as indicated at 40 in Fig. 4. Driving member 36 is yieldably held against a shoulder 37 on sleeve 34 by means of a disc spring member 38 which bears against a thrust ring 39 retained on sleeve 34 by a lock ring 41. A clutch member 42 is journaled on the driving member 36, and has a radial flange 43 which is yieldably connected to a similar flange 44 on the driving sleeve by means of a close-wound drive spring 45 having flattened convolutions to which the flanges 43 and 44 conform, the ends of the spring being anchored in said flanges in the same manner as described in the first embodiment of the invention.

Clutch member 42 is provided with overrunning clutch teeth 46 which engage similar clutch teeth 47 on a nut member 48 threaded on the screw shaft portion 49 of pinion member 32. A stop ring 51 on the end of the screw shaft 49 limits the outward travel of the pinion member and thereby defines its depth of mesh with the engine gear 33.

Nut 48 is provided with a radial flange 52, and a barrel member 53 is arranged to surround and enclose the flanged members. Barrel 53 limits the separation of the nut member 48 from the drive sleeve 36 by means of an inturned flange 54 at one end, and a lock ring 55 near its other end engaging the flange 44 of driving member 36. Lock ring 55 is so positioned as to limit the separation of the nut 48 from clutch member 42 to that necessary to permit overrunning of the clutch teeth 46, 47 when the spring 45 is unloaded.

A stop ring 56 is mounted on the pinion member 32 in position to engage the flange 54 of barrel 53 when the pinion is in idle position, and a light clutch spring 57 is located between the flange 54 of the barrel and the flange 52 of nut member 48 to normally hold clutch teeth 46, 47 together.

Centrifugally released means are provided for holding the pinion 32 in mesh with the engine gear 33 in the form of a detent 58 mounted for radial sliding movement in the flange 52 of nut 48, and pressed by a spring 59 against the screw shaft 49 so as to engage a retaining notch 61 suitably positioned on the screw shaft.

In the operation of this embodiment of the invention, actuation of the power shaft 31 causes rotation to be imparted through the driving member 36, spring 45 and clutch member 42 to the nut 48 whereby the pinion member 32 is traversed into mesh with the engine gear until stopped by the abutment ring 51. The cranking load thus placed on the drive causes the spring 45 to wind up and thereby become lengthened, thus positively preventing the disengagement of the clutch teeth 46, 47 during the cranking operation. In case of a false start, the spring 45 is temporarily unloaded and by unwinding permits the nut 48 to overrun the clutch member 42. At this time, however, the pinion is prevented from demeshing by the engagement of the detent 58 in the notch 61.

When a successful start is secured, the nut 48 is rotated by the pinion 32 which is driven by the engine flywheel at such speed as to cause detent 58 to be withdrawn by centrifugal force, thus permitting the pinion to be traversed back to its idle position.

Although but two embodiments of the invention have been shown and described in detail, it will be understood that changes may be made in the design and arrangement of parts without departing from the spirit of the invention.

I claim:

1. Starter gearing for internal combustion engines including a power shaft, a pinion having a radial flange slidably journaled thereon for movement into and out of mesh with a gear of the engine to be started, a flanged clutch member having an overrunning dental clutch connection to the pinion, a flanged driving member connected to rotate with the power shaft, a torsion drive spring having close-wound flattened convolutions connected to and bearing at its ends against the flanges of the driving member and clutch member, and a barrel member enclosing and limiting the separation of the drive member and pinion; in which the barrel member is so dimensioned as to permit the separation of the drive member and pinion sufficiently to allow the dental clutch to overrun when the drive spring is unloaded, but to prevent the dental clutch from disengaging when the spring is wound up by the cranking load; and including further a spring normally holding the dental clutch closed.

2. Engine starter gearing as set forth in claim 1 in which the flanges of the driving member and the clutch member are conformed to the end surfaces of the drive spring to provide full surface contact therewith.

References Cited in the file of this patent

UNITED STATES PATENTS

| 2,224,478 | Jones | Dec. 10, 1940 |
| 2,546,954 | Tobias | Mar. 27, 1951 |